INVENTOR.
MITCHELL P. MARCUS
BY Paul M. Brannen
AGENT

May 8, 1962 M. P. MARCUS 3,034,104

DATA SWITCHING APPARATUS

Filed Aug. 6, 1958 3 Sheets-Sheet 3

United States Patent Office 3,034,104

Patented May 8, 1962

3,034,104

DATA SWITCHING APPARATUS

Mitchell P. Marcus, Johnson City, N.Y., assignor to International Business Machines Corporation, New York, N.Y., a corporation of New York Filed Aug. 6, 1958, Ser. No. 753,443

12 Claims. (Cl. 340—172.5)

This invention relates in general to apparatus for handling data which is applied thereto simultaneously from a pair of data sources, and in particular to a two-way data compare-sort apparatus for dispatching data provided thereto simultaneously along two input lines to a pair of high and low relative magnitude data output lines.

The illustrative and preferred embodiment of the present invention is a two-way data compare-sort apparatus having a pair of data input lines and a pair of data output lines, one of the latter of which is designated as a high (Hi) data output line and the other of which is designated as a low (Lo) data output line. The function of the aforesaid apparatus is to initially compare the binary valued, serially ordered, high order first, input data which is provided thereto simultaneously on the aforesaid pair of input lines, and to then sort these data in accordance with the comparison results by operatively connecting each of the pair of input lines to a respective one of the pair of output lines. A significant feature of the subject data compare-sort apparatus is afforded by, (*a*) means which normally connect one data input line, e.g., the so-called primary data input line, to the high output line, and the other data input line, e.g., the secondary data input line, to the low output line, (*b*) other means to latch-connect, ie., to connect for a predetermined length of time, the primary data input line to the high output line and the secondary data input line to the low output line consequent upon the relative magnitude of the simultaneously provided input signals being such that the primary data input line signal is high, and (*c*) still other means effective to latch-connect the primary input line to the low output line and the secondary input line to the high output line consequent upon the relative magnitude of the simultaneously provided input signals being such that the secondary input line signal is high. The aforementioned other means "(*b*)" and still other means "(*c*)" remain operated for a predetermined time to latch-connect the input and the output lines as stated, until a reset signal is applied thereto. Thereupon, the aforesaid means "(*a*)" is effective to normally connect the primary input and high output lines as well as the secondary input and low output lines. It might also be brought out at this time that the subject data compare-sort apparatus includes a so-called inhibiting or interlocking means for preventing the operation of the aforesaid other means "(*b*)" after the operation of the said still other means "(*c*)" and also for preventing the operation of the said still other means "(*c*)" after the operation of the aforesaid other means "(*b*)." Thus, it should be clear that record blocks which are comprised of groups of serially ordered character data may be sorted in accordance with the first unmatched data comparison result so long as the aforementioned reset signal is applied to the two-way data compare-sort apparatus at the end of each record block. Furthermore, it should be clear that any size record blocks may be so handled so long as the reset signal is effective only at the end of a record block.

A broad object of this invention is to provide improved apparatus for handling data applied thereto simultaneously from a pair of data sources.

Another object of this invention is to provide a two-way data compare-sort apparatus for dispatching a pair of simultaneously provided input data signals to a pair of output lines in accordance with the relative magnitude of the input signals.

Another object of this invention is to provide a data compare-sort apparatus for dispatching along one of two lines a plurality of serially ordered character-data in accordance with an initial unmatched data comparison result. In keeping with the foregoing, another object of this invention is to provide data compare-sort apparatus for dispatching equal length record blocks in accordance with an initial unmatched data comparison result.

Another object of this invention is to provide apparatus for first latch-connecting each of a pair of data input lines to a respective one of a pair of data output lines in accordance with an initial unmatched input data comparison result, and then preventing a change of this latch-connect condition regardless of the relative magnitude of succeeding input data signals until a selectively timed reset signal is applied to the apparatus.

Other objects of the invention will be pointed out in the following description and claims and illustrated in the accompanying drawings, which disclose, by way of examples, the principle of the invention and the best mode, which has been contemplated of applying that principle.

*Definitions*

Prior to describing the present invention in detail, it is deemed advisable to define certain terms which are to be used throughout this specification as follows:

(1) A memory is any device in which information can be introduced and then extracted at a later time. Thus, a few such devices may be specified as magnetic tapes, magnetic drums, electrostatic storage elements, and magnetic core registers.

Figure 2:
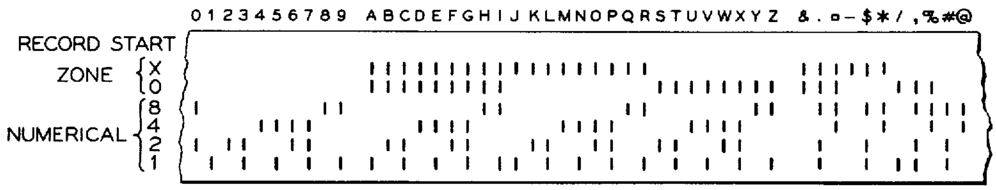
FIG. 2 illustrates the parallel-by-bit character-data code recorded on the tape file.

(2) A character-data is a set of elementary symbols, binary or otherwise, which may be arranged in ordered aggregates to express information . Thus, as shown in FIG. 2, the various character-data employed in the illustrative embodiment of the present invention are comprised of binary coded bits, of character-datum, for expressing numeric, alphabetic and special character symbols.

(3) Character-data read-write elements include those devices required to read and to write, respectively, individual sets of elementary symbols, i.e., the aforementioned binary coded bits of character-datum, expressing information. Thus, a character-data read device as employed in the system of FIG. 1 to read the code illustrated in FIG. 2, would require seven magnetic bit, or character-datum, read heads.

(4) A record block is defined as a group of serially ordered character-data which are to be considered as a unit, and accordingly, a record block must include at least a single character-data. Furthermore, fixed length record blocks must each include a similar number of character-data positions.

*Two-Way Data Compare-Sort Apparatus*

Figure 4:
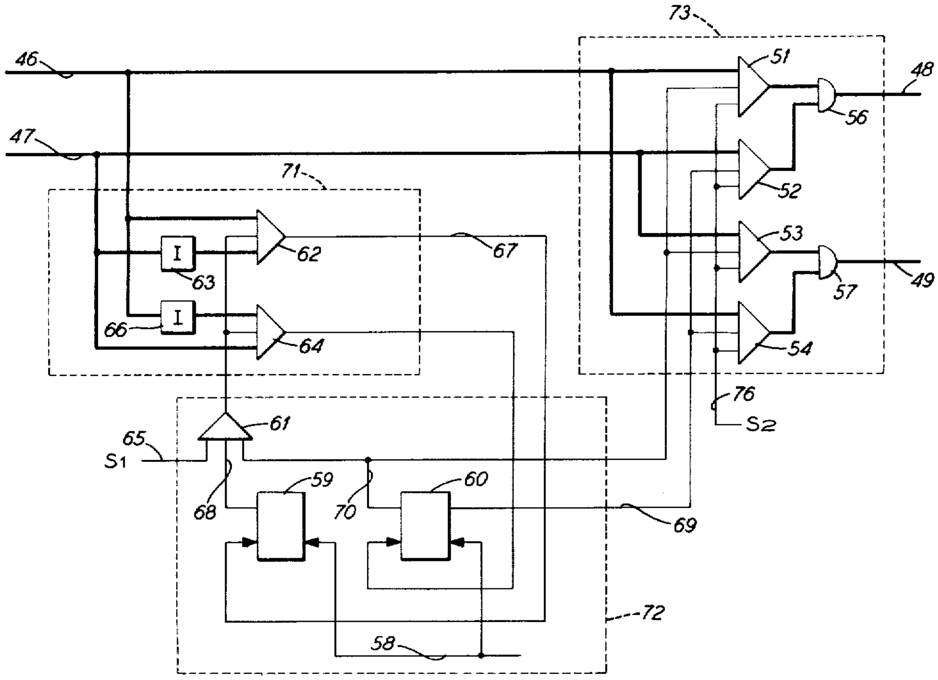
FIG. 4 is a schematic circuit diagram of the subject two-way data compare-sort apparatus.

*General.*—The data signals applied to the compare-sort apparatus input lines 46 and 47 (FIG. 4) are binary valued and serially ordered, high order first. It might be well to mention here that the data signals on a single data input line need not be binary coded, but merely that the relationship of the data signals on the two input lines be two valued. Since character-datum signals are provided on these input lines simultaneously, at any given time a signal on line 46 will be either higher than, equal to or lower than the correspondingly timed signal on line 47. The operation of the apparatus shown in FIG. 4 is such that so long as the primary data signals on line 46 match, or are equal to, the secondary data signals on line 47, the primary data signals will appear on high output line 48 whereas the secondary data signals will appear on low output line 49. Consequent upon the detection of the first unmatched data comparison result wherein the relative magnitude of the primary data signal is high with respect to the secondary data signal, the primary and the secondary input lines 46 and 47, respectively, will be latch-connected to the high and the low output lines 48 and 49, respectively. On the other hand, consequent upon the detection of the first unmatched data comparison result wherein the secondary data signal is high with respect to the primary data signal, the primary and the secondary input lines 46 and 47, respectively, will be latch-connected to the low and the high data output lines 49 and 48, respectively. These input-output line latch-connected conditions will remain effective until a reset timing signal is applied to the memory portion 72 of the subject apparatus.

Thus, in summation, the operation of the two-way data compare-sort apparatus may be stated as follows:

(1) So long as the primary and secondary character-data signals following a reset signal are matched, the primary and secondary input signals will appear on the high and low output lines 48 and 49, respectively.

(2) As a result of an initial unmatched data condition wherein the relative magnitude of a primary character-datum is high with respect to the correspondingly timed secondary character-datum, the primary and secondary input signals will appear on the high and low output lines 48 and 49, respectively. This condition will persist for any number of succeeding primary and secondary character-data regardless of their relative magnitudes, until a reset timing signal is applied to disable the latch-connect condition.

(3) Consequent upon the first unmatched condition wherein a secondary character-datum is high with respect to the primary character-datum, the primary and secondary input signals will appear on the low and the high data output lines 49 and 48, respectively. This condition will also remain in effect for any number of succeeding primary and secondary character-data regardless of their respective relative magnitudes, until a reset timing signal is provided to disable the latch-connect condition.

*Circuit description.*—As stated previously, the apparatus shown in FIG. 4 is one wherein signals appearing on the primary and the secondary data input lines 46—47 are normally dispatched to their respective high and low data output lines 48 and 49. Thus, if the signals appearing simultaneously on each of the input lines are positive, i.e., as matched signals, at S2 time (see also FIG. 5) the primary signal on line 46 will be gated to the high output line 48 via the AND gate 51 and the OR gate 56. Similarly, the secondary signal will appear on the low output line 49 at S2 time via the AND gate 53 and the OR gate 57. These AND gates are enable at this time by a pulse on line 76, as well as the energization of the common input 70 to AND gates 51 and 53 from trigger 60, which is present since it is assumed that the trigger 60 has not been turned ON after having been previously reset by the application of a reset timing signal on reset line 58.

In response to the first unmatched data condition following the application of a reset signal to line 58, the input lines 46 and 47 will be latch-connected to the output lines 48 and 49 as indicated previously. Let it be assumed first that the initial unmatched data condition is one wherein the binary valued, serially ordered, high order first, primary data input line 46 signal is positive and the secondary data input line 47 signal is less positive so as to be preferably at zero or a negative potential. Thus, at time T1 (see FIG. 5) when the primary input line 46 is positive and the secondary input line 47 is negative, all of the inputs to AND gate 62 will be positive. This, of course, is due to the fact that the negative secondary input line signal is inverted by inverter 63, and the output of AND gate 61 is positive since signal S1 is present and both triggers 59 and 60 are Off, having been reset previously, and hence provide signals on lines 68 and 70. Thus, at time T1 a positive signal will appear at the output of AND gate 62 to be applied to trigger 59 via line 67 so as to turn trigger 59 On. This, in turn, will cause a negative signal to be applied to the center input 68 of AND gate 61, to thereby remove the positive signal previously applied from the output of AND gate 61 to the inputs of both of the AND gates 62 and 64. Since trigger 59 will remain in the On state until a reset signal is applied thereto along the line 58, a positive signal cannot appear on either of the output lines of AND gates 62 and 64 until the trigger 59 is reset Off. Thus, the trigger 60 cannot be turned On via AND gate 64 until after trigger 59 has been reset Off. Accordingly, the input lines 46 and 47 of the two-way data compare-sort apparatus shown in FIG. 4 will remain latch-connected to the output lines 48 and 49, respectively, regardless of the relative magnitudes of successively applied input character data until a reset signal is applied to trigger 59 to turn the same Off.

When the first unmatched character-datum condition following the application of a reset signal to the triggers 59 and 60 is one wherein a positive signal appears on the secondary input line 47 simultaneously with the application of a negative signal on the primary input line 46, all of the input signals to the AND gate 64 will be positive at time T1. As a result, a positive output signal will be applied from the output side of AND gate 64 to trigger 60, to thereby turn this trigger On. It should be clear from FIG. 4 that when trigger 60 is On, a positive signal is applied to the respective inputs of gates 52 and 54 via line 69, whereas the positive signal previously applied to the inputs of AND gates 51, 53 and 61 via line 70, is removed. It should also be clear that since one of the inputs to AND gate 61 has been made negative, the inputs to AND gates 62 and 64 connected to the output of AND gate 61 will also be negative. This condition will persist until trigger 60 is reset Off by the timing pulse applied to line 58. As a result of the operation of trigger 60, the apparatus will be latch-connected so that the primary character-data signals appearing on line 46 will now be dispatched to the low output line 41 via AND gate 54 and OR gate 57, whereas the secondary character-data signals appearing on line 47 will be dispatched to the high output line 48 via AND gate 52 and OR gate 56. Since the AND gates 52 and 54 are each conditioned to pass positive signals at S2 time so long as trigger 60 is turned On, and since trigger 60 once having been turned On remains in this stable state until a reset signal is applied thereto, all of the primary and secondary character-data signals appearing successively on their respective lines 46 and 47 after the initial afore-described unmatched character-data condition will appear along the low and high output lines 49 and 48, respectively.

Figure 6:
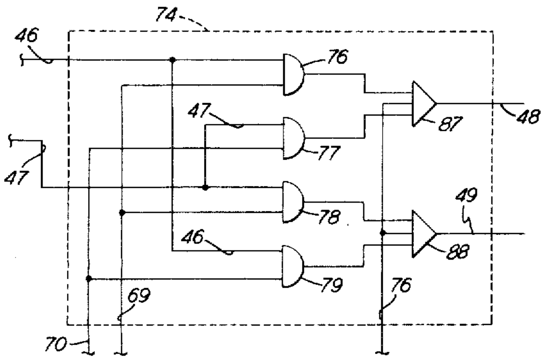
FIG. 6 is a wiring diagram of an alternate data switching and gating arrangement for use with the apparatus shown in FIG. 4.

*Alternate data switching and gating apparatus.*—Referring to FIG. 6, the apparatus within broken-line block 74 may be substituted for the structure within broken-line block 73 of FIG. 4. The inputs to the OR gates 76–79 would be connected to the lines 46, 47, 69 and 70 of FIG. 4.

Thus, if the two-way data compare-sort apparatus associated with the structure shown in FIG. 6 is so latch-connected as to cause the line 69 to have a positive potential applied thereto, positive primary data input signals on line 46 will be dispatched to the low output line 49 via AND gate 88 at S2 time, whereas secondary input signals will appear on high output line 48 via AND gate 87. On the other hand, should the afore-mentioned apparatus be so latch-connected as to cause a positive signal to appear on line 70, the primary data input signals along line 46 will appear on output line 48 via AND gate 87, whereas the secondary input signals will appear on the low output line 49 via the AND gate 88.

Figure 7:
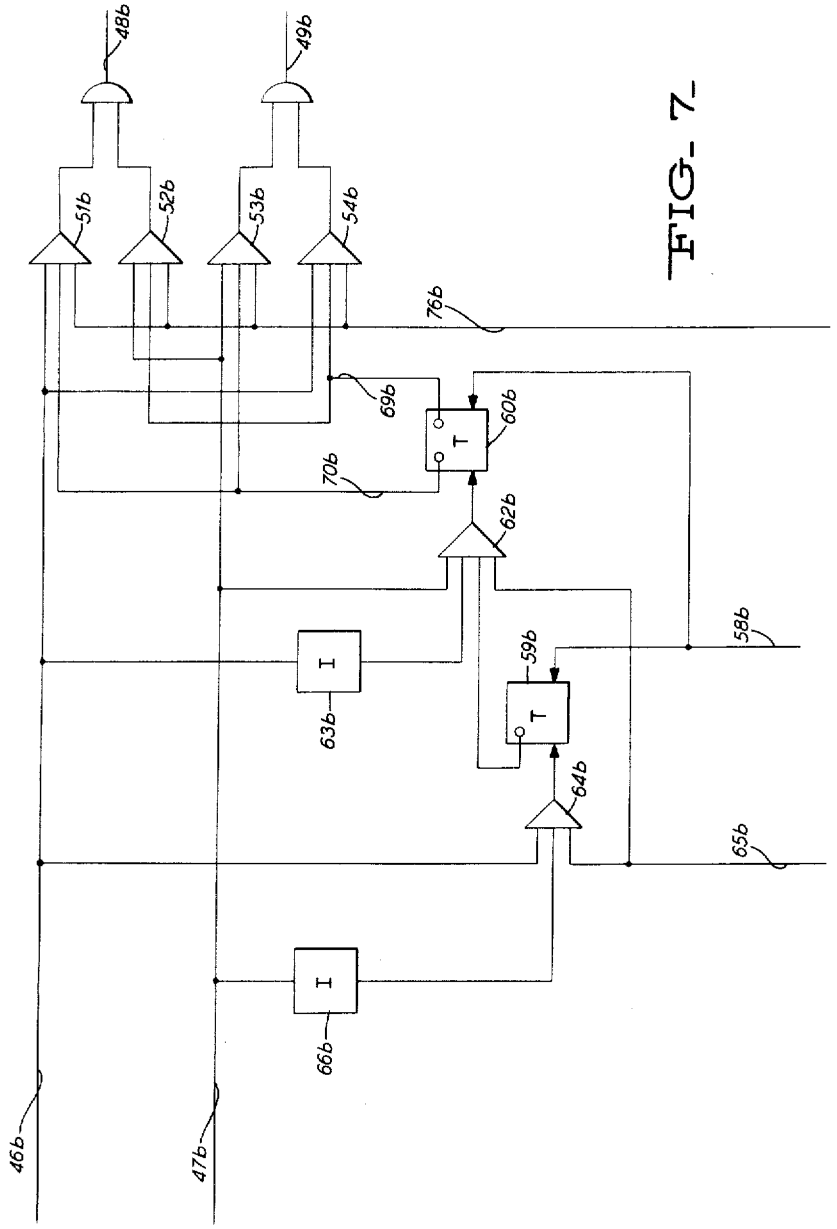
FIG. 7 is a schematic circuit diagram of a second embodiment of the invention.

*Alternate two-way data compare-sort apparatus.*—Another embodiment of the subject invention is shown in FIG. 7. The data signals applied to the compare-sort apparatus input lines **46*b* and 47*b* are binary valued and serially ordered, high order first. Since character-datum signals are provided on these input lines simultaneously, at any given time a signal on line 46*b* will be either higher than, equal to or lower than the correspondingly timed signal on line 47*b*. The operation of this apparatus is such that so long as the primary data signals on line 46*b* match, or are equal to, the secondary data signals on line 47*b*, the primary data signals will appear on high output line 48*b* whereas the secondary data signals will appear on low output line 49*b*. Consequent upon the detection of the first unmatched data comparison result wherein the relative magnitude of the primary data signal is high with respect to the secondary data signal, the primary and the secondary input lines 46*b* and 47*b*, respectively, will be latch-connected to the high and the low output lines 48*b* and 49*b*, respectively. On the other hand, consequent upon the detection of the first unmatched data comparison result wherein the secondary data signal is high with respect to the primary data signal, the primary and the secondary input lines 46*b* and 47*b*, respectively, will be latch-connected to the low and the high data output lines 49*b* and 48*b* respectively. These input-output line latch-connected conditions will remain effective until a reset timing signal appears on reset line 58*b***.

To describe the operation of the apparatus shown in FIG. 7 in more detail, in response to the first unmatched data condition following the application of a reset signal to line **58*b*, the lines 46*b* and 47*b* will be latch-connected to the output lines 48*b* and 49*b* as indicated previously. Let it be assumed first that the initial unmatched data condition is one wherein the binary valued, serially ordered, high order first, primary data input line 46*b* signal is positive and the secondary data input line 47*b* signal is less positive so as to be preferably at zero or a negative potential. Thus, at time T1 (see also FIG. 5) when the primary input line 46*b* is positive and the secondary input line 47*b* is negative, all of the inputs to AND gate 64*b* will be positive. This is due to the fact that the negative secondary input line signal is inverted by inverter 66*b*, and a positive signal appears on the S1 sample line 65*b*. Thus, at time T1 a positive signal will appear at the output of AND gate 64*b* to be applied to trigger 59*b* in order to turn this trigger On. This, in turn, will cause a negative signal to be applied to one of the plural inputs associated with AND gate 62*b* via the line connected to the Off output of trigger 59*b*. Since trigger 59*b* will remain in the On state until a reset signal is applied thereto on the line 58*b*, a positive signal cannot appear on the output line of AND gate 62*b* until trigger 59*b* is reset Off. Thus, the trigger 60*b* cannot be turned On until after trigger 59*b* has been reset to an Off state. Accordingly, a positive signal will appear on line 70*b* and the input lines 46*b* and 47*b* of the two-way data compare-sort apparatus shown in FIG. 7 will remain latch-connected to the output lines 48*b* and 49*b*, respectively, regardless of the relative magnitudes of successively applied input character-data until a reset signal is applied to trigger 59*b*** so as to turn the same Off.

Figure 5:
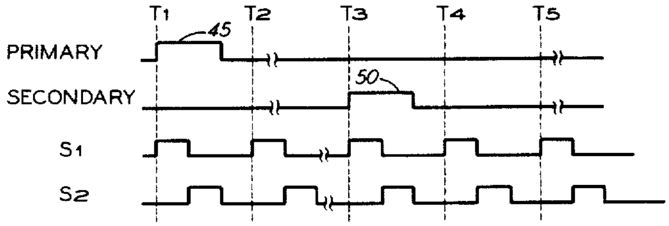
FIG. 5 is a timing chart of certain signals applied to the apparatus shown in FIG. 4.

When the first unmatched character-datum condition following the application of a reset signal to the triggers **59*b* and 60*b* is one wherein a positive signal appears on the secondary input line 47*b* simultaneously with the application of a negative signal on the primary input line 46*b*, all of the input signals to the AND gate 62*b* will be positive at time T3 (see also FIG. 5). As a result, a positive output signal will be applied from the output side of AND gate 62*b* to trigger 60*b*, to thereby turn this trigger On. When trigger 60*b* is On, a positive signal is applied to line 69*b* so as to latch-connect the input lines 46*b* and 47*b* to the output lines 49*b* and 48*b*, respectively, until a reset signal is applied to line 58*b* so as to turn trigger 60*b* Off. It should also be clear from FIG. 7 that after trigger 60*b* is once turned On, it does not matter thereafter whether trigger 59*b* is off or on. This latter-mentioned condition will exist until trigger 60*b* has been reset Off by the reset signal from line 58*b***.

*Operation and Summary*

Figure 1:
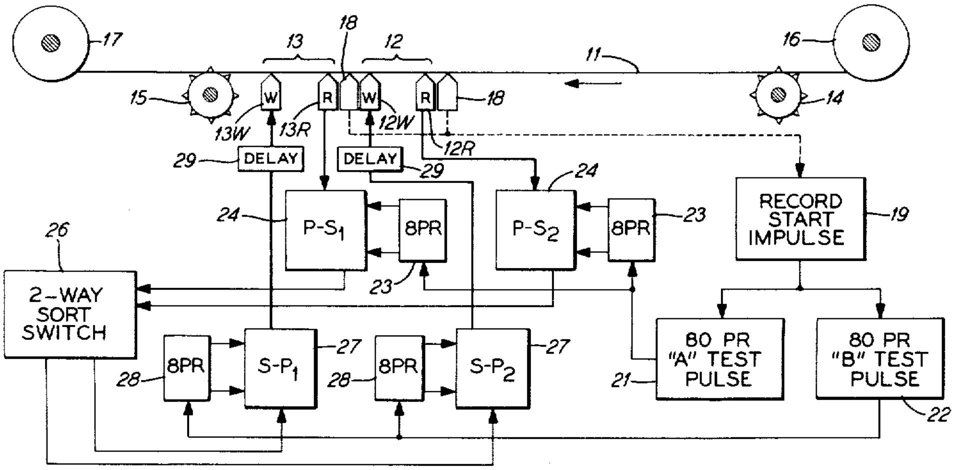
FIG. 1 is a block diagram which illustrates the use of the preferred embodiment of the present invention in a two recording position tape file sorting system.

As stated previously, FIG. 1 is a block diagram of a data handling system wherein the subject two-way data compare-sort apparatus is used. Referring thereto, the magnetic tape file 11 (see also FIG. 2) is employed as a memory for a plurality of equal length record blocks each of which, for the purposes of this specification, include eighty parallel-by-bit, serially ordered character-data in a distance of one inch of the tape file. The binary valued character-data for numeric, alphabetic and special character symbols (see also FIG. 2) is one wherein, for example, the numeral "1" is represented by a binary "1" bit in the No. 1 tape channel, whereas the alphabetic character "A" is represented by the 1, 0 and X-binary 1 bits. Similarly, the special character "$" is represented by the 1, 2, 8 and X-binary 1 bits, and the blank character-data is represented by an absence of all character-data binary 1 bits. It is understood that binary "0" bits are recorded in each position where a binary "1" bit is not recorded.

The tape file 11 (FIG. 1) is advanced past two pairs of associated read-write character-data magnetic heads 12 and 13 by a conventional sprocket drive means 14–15. Thus, the tape file is advanced at a constant rate of speed from supply reel 16 past the character-data read heads 12R and 13R which are spaced one record block apart, past their associated character-data write heads 12W and 13W which are also spaced one record block apart, to the take-up reel 17.

Each of the pairs of associated character-data read-write heads, such as the pairs designated by the reference numeral 12, includes seven respective character-datum read and write heads 12R and 12W, one for each of the parallel binary bit notation channels on the tape file (see also FIG. 2). Thus, the pair of associated magnetic read-write heads designated by the reference numeral 12 in FIG. 1, includes seven parallel read heads 12R and seven corresponding write heads 12W. Immediately prior to the time that the first serially ordered, parallel-by-bit, high order first, character-data in a record block is moved in operating relationship to a character-data reading head, such as magnetic head 12R for example, a so-called record start tape recorded bit is selected by one of the two record start read heads 18 positioned along the record start channel of the tape file (see also FIG. 2). When such a record start bit is read, a record start impulse is applied simultaneously from the circuit apparatus 19 to a pair of "A" and "B" eighty-step or-point test pulse rings 21 and 22, respectively, to start the operation of these rings. Each "B" pulse is timed to occur during a period intermediate two successive "A" pulses. The first "A" pulse will be applied simultaneously to two eight-point rings 23 just as the first character-data in each of two respective record blocks is moved past a corresponding one of the character-data read heads 12R and 13R. Hence, during the time defined by the first point of the eight-point rings 23, parallel-by-bit character-data defining signals of the first character-data within their respective record blocks will be applied from each of the aforesaid character-datum read heads to a respective parallel-by-bit to serial-by-bit (P to S) translating static register 24. During a time defined by the next following seven points of operation of ring 23, the character-data signals stored in each of the registers 24 are caused to be read out therefrom serial-by-bit, high order first. These serial-by-bit character-data defining signals are applied simultaneously to the two-way data compare-sort embodiment 26 of the present invention. These simultaneously entered binary valued character-data signals from the two aforesaid registers 24 are first compared and then dispatched on the basis of their relative magnitudes to the output lines of apparatus 26, in the manner previously described in detail. Thus, the character-data of the lowest relative magnitude is applied from apparatus 26 to the serial-by-bit to parallel-by-bit (S to P) translating static register 27 associated with the character-data writing head 13W. Similarly, the character-data of highest relative magnitude is applied to the "S to P" register 27 which is associated with other character-data writing head 12W.

As is shown in FIG. 1, the operation of each of the static registers 27 is governed by a respective eight-point ring 28 which, in turn, is started on its eight-point cycle operation by the application of a "B" test pulse from apparatus 22. During the first seven points of operation of ring 28, the serial-by-bit defined character-data is applied from the compare-sort apparatus 26 to the registers 27 bit-by-bit in timed sequence with the operation of ring 28. During the eighth point of operation of the ring 28, the now stored serial-by-bit character-data in the registers 27 is read out of their respective registers in parallel-by-bit form to the respective character-data write head delay units 29. The data entered into these units 29 are stored therein until the section of the tape file 11 from which these data were originally read, is advanced past the write heads 12W—13W for recording.

Thus, in summation, consequent upon each of the eighty successively arranged character-data positions available within any given record block being moved past a respective character-data read head, the data therein are translated after being read from parallel-by-bit form to serial-by-bit form. The data are then applied simultaneously to the two-way data compare-sort apparatus whereupon the character-data defining signals are dispatched to the output lines of the apparatus in accordance with the relative magnitude of the initially unmatched character-datum. These data are next translated from serial-by-bit form to parallel-by-bit form prior to being stored for a required length of time in a delay unit 29, after which time the data are recorded. As brought out previously, once the compare-sort apparatus 26 is latch-connected in response to the initial unmatched datum comparison condition, the operation of this apparatus will be such as to sort all of the character-data in any given record block in accordance with this initial sort resulting from the first unmatched character-datum condition.

Figure 3:
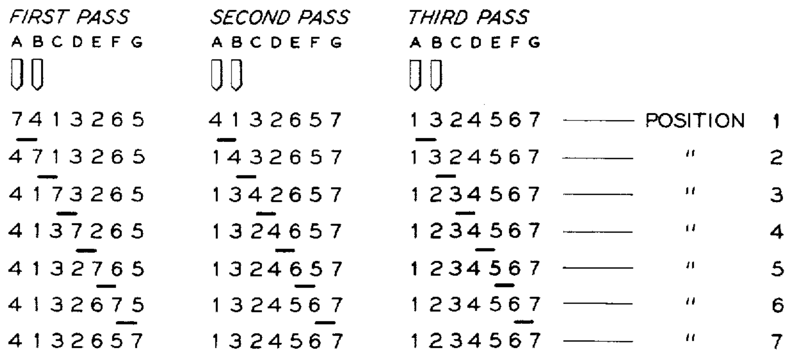
FIG. 3 depicts the manner in which character-data are handled for sorting by the system shown in FIG. 1.

*Two-way sort operation.*—A two-way sort operation for seven record blocks, each of which includes only a single character-data, is illustrated in FIG. 3. As is shown therein, three passes of the tape file, whereon the seven record blocks are stored, are required to rearrange the seven randomly recorded character-data 7413265 to the predetermined ascending ordered sequence 1234567. During the first pass, each character-data is first compared with its adjacent character-data as the tape file advances, and is then rearranged whenever necessary to conform with a predetermined ascending ordered sequence. During the second tape file pass, the now "first pass" rearranged character-data 4132657 are further rearranged to afford a result of 1324567. After one additional tape file pass, i.e., the third, these character-data 1324567 are rearranged to 1234567 to conform with the predetermined ascending ordered sequence.

*Summary.*—The operation of the subject two-way data compare-sort apparatus is such that so long as the input primary and secondary character-datum signals are matched after reset time, the primary and the secondary input signals will be dispatched to the high and the low output lines, respectively. In response to the first unmatched character-datum condition following reset time, wherein the primary character-data is high with respect to the secondary character-data, the subject apparatus is operated to latch-connect the primary and the secondary input lines to the high and the low output lines, respectively. Similarly, in response to an initial unmatched character-datum condition following reset time, wherein the relative magnitude of the secondary character-data is high with respect to the primary character-data, the subject apparatus is effective to latch-connect the primary and the secondary input lines to the low and the high output lines, respectively. The latch-connect condition will remain effective until the next following reset signal is applied to the memory portion of the subject apparatus.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for sorting signals from a pair of data sources, which signals are representative of record blocks each of which includes at least a single binary coded character-data ordered serially, comprising a pair of input lines, each of which is coupled to a respective one of said data sources; a pair of output lines, one of which is designated high and the other of which is designated low; normally effective first means to connect each of said input lines to a respective one of said high and low output lines; normally disabled second means to connect each of said input lines to the other of the aforesaid respective one of said high and low output lines; other means for disabling said first means and rendering effective said second means; third means for latching said first means consequent upon the signals provided from one of said sources being greater than the signals provided from the other of said sources; and fourth means for latching said other means consequent upon the signals provided from the aforesaid one of said sources being of lesser magnitude than the signals provided from the aforesaid other one of said sources.

2. Apparatus according to claim 1 additionally comprising means for resetting said third means and said fourth means at the end of a record block.

3. In an arrangement for sorting two coded character-data ordered serially and having a primary data source for generating signals representative of primary character-data, a secondary data source for generating signals representative of secondary character-data, a high relative magnitude character-data output line, and a low relative magnitude character-data output line, the combination comprising a two-way compare-sort apparatus comprising electrical means to normally connect said primary character-data source to said high character-data output line and said secondary character-data source to said low character-data output line, other electrical means to latch-connect said primary character-data source to said high character-data output line and said secondary character-data source to said low character-data output line consequent upon a signal from said primary data source being of higher relative magnitude than a simultaneous signal from said secondary data source, and still other electrical means to latch-connect said primary character-data source to said lower character-data output line and said secondary character-data source to said high character-data output line in response to a signal from said secondary data source being of higher relative magnitude than a simultaneous signal from said primary data source.

4. An arrangement for sorting a pair of binary coded character-data ordered serially, high order first, comprising a primary character-data source; a secondary character-data source; a high character-data output line; a low character-data output line; a two-way compare-sort apparatus having means to normally connect said primary character-data source to said high output line and said secondary character-data source to said low output line, other means to latch-connect said primary character-data source to said high output line and said secondary character-data source to said low output line consequent upon the relative magnitude of the signals simultaneously provided by said primary and said secondary character-data sources being such that the primary character-data source signal is high, and still other means effective to latch-connect said primary character-data source to said low output line and said secondary character-data source to said high output line consequent upon the relative magitude of the signals simultaneously provided from said primary and said secondary character-data sources being such that the secondary character-data source signal is high; and inhibiting means for preventing the operation of said other means after the operation of said still other means and also preventing the operation of said still other means after the operation of said other means.

5. An arrangement for sorting a pair of binary coded character-data ordered serially, high order first, comprising a primary character-data source; a secondary character-data source; a high character-data output line; a low character-data output line; electrical means to normally connect said primary character-data source to said high output line and said secondary character-data source to said low output line; other electrical means to latch-connect said primary character-data source to said high output line and said secondary character-data source to said low output line consequent upon the relative magnitude of the signals simultaneously provided by said primary and said secondary character-data sources being such that the primary character-data source signal is high, and to latch-connect said primary character-data source to said low output line and said secondary character-data source to said high output line consequent upon the relative magnitude of the signal provided simultaneously by said primary and said secondary character-data sources being such that the secondary character-data signal is high; inhibiting means controlled by said other electrical means for preventing a change of said other electrical means from one latch-connect condition to the other latch-connect condition; and means for disabling said other electrical means at the end of each binary coded character-data.

6. In apparatus for sorting, from a pair of data sources, signals representative of binary coded character-data ordered serially, high order first, a pair of input lines each of which is coupled to a respective one of said data sources, and a pair of output lines, one of which is designated high and the other of which is designated low, the combination of a two-way compare-sort apparatus comprising a first trigger, a second trigger, two-pair of AND gates, the first pair being normally effective to connect the high output line to said primary data source and the low output line to said secondary data source, the second pair being normally disabled to connect the high output line to said secondary data source and the low output line to said primary data source, and a means for operating said first trigger consequent upon the relative magnitude of the character-data signals provided simultaneously from said primary and said secondary character-data sources being such that the primary character-data source signal is high, whereupon the high and the low output lines are respectively latch-connected to said primary and said secondary character-data sources until the end of the binary coded character-data.

7. Apparatus according to claim 8 additionally comprising means for operating said second trigger consequent upon the relative magnitude of the signals simultaneously provided by said primary and said secondary character-data sources being such that the secondary character-data source signal is high, whereupon said first pair of AND gates are disabled and said second pair of AND gates are rendered effective to respectively connect the low and the high output lines to said primary and said secondary character-data sources.

8. Apparatus according to claim 7 additionally comprising means including an AND gate between the output of said first trigger and the input to said second trigger for preventing the operation of said second trigger in response to a previous operation of said first trigger.

9. Apparatus according to claim 8 additionally comprising means connected to said first and said second trigger reset lines for resetting said triggers at the end of a binary coded character-data, to thereby disable the latch-connect condition provided in response to the operation of a trigger.

10. Apparatus for sorting, from a pair of data sources, signals representative of binary coded character-data ordered serially, high order first, comprising a pair of primary and secondary input lines each of which is coupled to a respective one of said data sources, a pair of high and low data output lines, gating means for connecting the input lines to the output lines, a first trigger for governing said gating means so as to connect the high and the low output lines respectively to the primary and the secondary input lines in response to said trigger being in one stable state, and the high and the low output lines being connected respectively to the secondary and the primary input lines in response to said trigger being set to the other stable state, means for setting said trigger to the first stable state, means for setting said trigger to the second stable state consequent upon the relative magnitude of the signals provided on the primary and the secondary input lines being such that the secondary input line signal is high, and means including a second trigger for preventing the setting of said first trigger to the second stable state consequent upon the relative magnitude of the signals provided simultaneously along the primary and the secondary input lines being such that the primary input line signal is high prior to a secondary input line signal being high.

11. An apparatus according to claim 10 for sorting record blocks each of which includes at least one binary coded character-data additionally comprising means for providing a signal at the end of each record block and electrical means for connecting said timing means and said first and said second trigger reset means, to thereby effect the restoration of said gating means at the end of a record block.

12. Apparatus for sorting, from a pair of data sources, signals representative of binary coded character-data ordered serially, high order first, comprising a pair of primary and secondary input lines, each of which is coupled to a respective one of said data sources, a pair of high and low data output lines, switching means effective in a first condition to connect said primary input line to said high output line and to connect said secondary input line to said low output line and effective in a second condition to reverse the connections of said input and output lines, a first bistable device operable between a first and a second condition, means for controlling said switching means to said first or said second condition in accordance with the first or the second condition of said first bistable device, a second bistable device operable between a first and a second condition, coincidence means effective when the relative magnitude of the signal on said primary input line in lower than the relative magnitude of the signal on said secondary input line and said second bistable device is in its first condition for operating said first bistable device to its second condition, and other coincidence means effective when the relative magnitude of the signal or said primary input line is higher than the relative magnitude of the signal on said secondary input line for setting said second bistable device to its second condition, and reset means for at times setting said first and said second bistable devices to their first conditions.

References Cited in the file of this patent

UNITED STATES PATENTS

| | | |
|---|---|---|
| 706,084 | Moskowitz | Aug. 5, 1902 |
| 2,798,216 | Goldberg et al. | July 2, 1957 |
| 2,821,696 | Shiowitz et al. | Jan. 28, 1958 |